Figure 1:
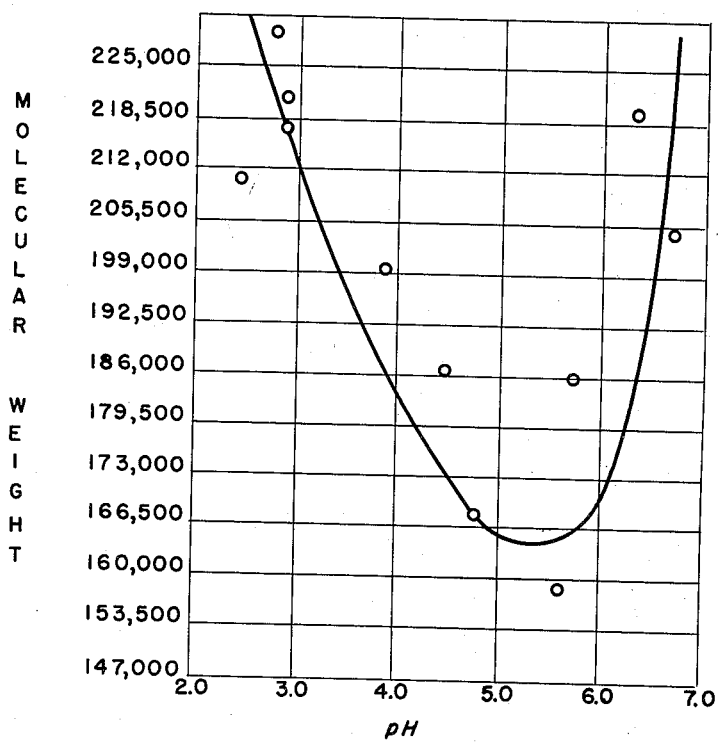

INVENTOR.
HUGH THOMAS PATTERSON
ATTORNEY.

Patented Oct. 6, 1953

2,654,731

UNITED STATES PATENT OFFICE 2,654,731

POLYMERIZATION CONTROL OF ACRYLONITRILE

Hugh T. Patterson, Waynesboro, Va., assignor to E. I. du Pont de Nemours and Company, Wilmington, Del., a corporation of Delaware Application January 19, 1951, Serial No. 206,762

10 Claims. (Cl. 260—88.7)

This invention relates to the preparation of acrylonitrile polymer and, in particular, to a process for obtaining acrylonitrile polymer having uniform, high, predetermined molecular weights in good yields.

Acrylonitrile polymers can be dissolved in certain volatile organic solvents, such as are disclosed in U. S. Patents 2,404,714–2,404,727, inclusive, to form solutions suitable for extrusion into shaped articles such as yarns. The yarns are moderately easy to prepare by standard wet- and dry-spinning techniques, and they are eminently suited for use in the textile art. In fact, there is a great demand in the textile industry for a yarn having the outstanding properties, such as high tenacity, good outdoor durability, and the insolubility in, and insensitivity to common organic solvents, possessed by polyacrylonitrile yarns.

A process for producing consistently polyacrylonitrile having an average molecular weight in the range of 50,000 to 90,000 is available, and polyacrylonitrile of this average molecular weight is particularly useful for the preparation of solutions to be used in dry-spinning yarns. However, much higher molecular weight polymers are preferred in the wet-spinning of yarns and for the preparation of films and molding compositions. Hitherto, no process was available for preparation of polyacrylonitrile having uniform molecular weights of 130,000 and above.

Accordingly, an object of this invention is to prepare polyacrylonitrile having a uniform high molecular weight. A further object of this invention is to prepare polyacrylonitrile having a uniform molecular weight of at least 130,000, in the range 130,000 to 220,000 and preferably in the range of 160,000–200,000. A still further object is to produce polyacrylonitrile in a continuous manner having a uniform average molecular weight of between 160,000 and 200,000. Still another object of the invention is to produce high molecular weight polyacrylonitrile in good yields and of such uniformity in molecular weight that blending prior to its use is not necessary. Other objects will appear hereinafter.

The objects of this invention are accomplished by polymerizing acrylonitrile in an aqueous solution in the presence of a water-soluble perdisulfate derivative as the sole catalyst at a relatively constant acidity, that is, at a pH between 4.0 and 6.3 and preferably at a pH between 5.0 and 5.8. It has been found that the pH of the polymerization system has a profound effect on the molecular weight of the product obtained. This effect is shown in Figure 1, wherein pH is plotted against the average molecular weight of polymer products. It can be seen from this graph that the highest molecular weight products are obtained by maintaining the pH of the polymerization mixture below 3.5 or above 6.5. At a pH of about 5.4, a minimum in the curve is reached and polymerization at about pH 5.4 allows the greatest flexibility and ease in controlling the average molecular weight of the reaction product throughout the polymerization. Obviously on a steep portion of the curve, the control of pH must be much more accurate in order to produce consistently polyacrylonitrile having a narrow average molecular weight range.

This invention is illustrated by the following examples which are not limitative and in which parts and percentages are by weight.

EXAMPLE I

A reaction kettle charged with 1,870 parts of water is heated to 60° C. A constant pressure of nitrogen is maintained above the liquid level by allowing the gas to bubble slowly out of a water seal on an attached condenser. When the water reaches 60° C., the following reactants are added:

120 parts acrylonitrile
2.4 parts ammonium perdisulfate (2.0% based on the monomer)
and enough 2N sulfuric acid to bring the pH of the mixture to 5.4.

With constant mechanical agitation the reaction mixture becomes cloudy in 5–10 seconds. After 45 minutes of batch reaction, the various reactants are metered into the polymerizer at rates adjusted to keep the concentration of the reactants constant at the above ratios throughout the reaction. The feed for the continuous reaction should contain 11.1% by weight of acrylonitrile in order to maintain the acrylonitrile monomer content of the kettle around 2.7% by weight of the charge. The pH of the slurry in the kettle is measured periodically and kept at 5.4 by adding the appropriate amount of aqueous acid continuously with the other feeds. As the additional reactants are added to the kettle, the slurry of polymer in the kettle overflows and is continuously filtered. The addition of reactants and the corresponding slurry overflow is adjusted to pass a charge of 2,000 parts of material through the kettle every 60 minutes. Also, 70–100 parts of these samples of slurry are weighed and filtered. The collected polymer is washed with water and acetone, then dried at 80° C. and weighed to determine monomer conversion. The dried polymer thus obtained is used for molecular weight determination. The average molecular weight of each sample of polymer is in the range of 155,000 to 175,000 and the majority of them are in the range of 162,000 to 170,000.

EXAMPLE II

In a series of experiments carried out as described above in Example I, the pH of the polymerization medium was varied. The replacement cycle for reactants was 60 minutes and the continuous polymerizations were carried out for periods of time of about 6 hours. Slurry samples for molecular weight determination were taken more frequently, about one every hour and a half. The results are shown in the table, and are the basis for the curve shown in Figure 1.

Table

| pH | Mol. Wt. |
| --- | --- |
| 2.45 | 212,000 |
| 2.8 | 230,000 |
| 2.9 | 222,000 |
| 2.9 | 218,000 |
| 3.9 | 200,000 |
| 4.5 | 187,000 |
| 4.8 | 169,000 |
| 5.65 | 159,000 |
| 5.76 | 187,000 |
| 6.33 | 220,000 |
| 6.71 | 205,000 |

The average molecular weights described in this invention were obtained from viscosity data by using the equation:

molecular weight = 32,700 × intrinsic viscosity

The molecular weights obtained in this fashion were found to compare very well with those calculated from the Staudinger equation.

Since the molecular weight of a vinyl polymer usually depends, among other factors, upon the catalyst concentration and temperature conditions during polymerization, a vertical displacement along the molecular weight axis of the curve shown in Figure 1 is usually found when these factors are varied. If a higher catalyst concentration and/or higher temperature is used, the molecular weight at the various pH levels will be somewhat lower. The shape of the curve and the location of its minimum point along the pH axis will be the same as in Figure 1. Likewise, the curve will be displaced to higher molecular weight regions if smaller amounts of catalyst and/or lower temperatures are used. Consequently, by proper manipulation of the catalyst and temperature conditions the minimum point of the curve shown in Figure 1 can be made to occur at practically any molecular weight between 130,000 and 220,000. This flexibility of operation constitutes a great advantage in the practice of this invention.

The catalyst may be any water-soluble derivative of perdisulfuric acid, such as sodium, potassium, lithium, barium, magnesium, calcium and ammonium perdisulfate, used in the absence of an activator. The catalyst concentration may be varied within wide limits e. g. in the range of 0.5–4% by weight of monomer. In fact, as previously pointed out, the variation of catalyst concentration may be employed advantageously to locate the minimum point of the curve relating pH to molecular weight at any desired molecular weight between 130,000 and 220,000. For example, with 4% catalyst by weight of monomer, the minimum point of the curve of Figure 1 falls at a molecular weight of about 135,000. For the production of polymer for preparing polyacrylonitrile yarns by a wet-spinning process or for preparing films and molded objects, the catalyst concentration should be about 2.0% by weight based on the monomer while operating at a temperature of about 60° C.

The process of this invention is capable of being operated at slightly elevated temperature, for example from 40°–75° C. Preferably, however, the process is operated at a temperature of 60° C.

The process is preferably operated under an atmosphere of an inert gas. The inert medium may be selected from a large number of materials including nitrogen, carbon dioxide, methane or helium. Greater control over the polymerization is attained in the absence of air.

Likewise, the process is not limited to any particular apparatus. Suitable vessels include those constructed of stainless steel, aluminum, nickel, silver or lead. Vessels equipped with glass or enamel liners may also be used.

Variation of the replacement cycle time has been found to have little or no effect on the preparation of polymer. Polyacrylonitrile prepared in accordance with this invention with a 60 minute cycle cannot be distinguished from that prepared using a 92 minute cycle. Longer or shorter cycles may be used as desired.

Using the process of this invention, the conversion from acrylonitrile monomer to polymer is consistently under 85%. This is desirable because more linear polymer chains are produced. Undesirable chain branching is known to occur in vinyl polymerization, particularly when the conversion from monomer to polymer exceeds 85%. When operating under the process of this invention at a pH between 4 and 6.3, the conversion of monomer to polymer is consistently between 68–75%.

In contrast to the uniform polymer prepared as described in Example I, wherein most of the polymer samples have an average molecular weight within 162,000–170,000, polyacrylonitrile prepared under the same conditions in the absence of pH control varies considerably in molecular weight. This polymer, having a much greater distribution of molecular weights, results in poorer physical properties in shaped articles. In addition, yarn prepared from this polymer exhibits inferior drawing continuity in subsequent stretching operations and its physical properties are correspondingly non-uniform. Particularly notable is the loss of tensile strength and abrasion resistance.

The process of this invention is especially useful in preparing uniform polymers of acrylonitrile having a predetermined molecular weight in the range of 130,000–220,000. A process has been described for the preparation of a preferred polyacrylonitrile, having an average molecular weight between 160,000 and 170,000, for the preparation of yarns from solutions of the polymer in dimethyl formamide by wet-spinning techniques. Polyacrylonitrile yarns have highly desirable tensile and elongation properties and are especially well-known for their resistance to weathering and common organic solvents, such as used in dry cleaning.

The process is preferably operated on a continuous basis because the polymers so prepared are most uniform and the process is most economical. Troublesome chain branching is avoided since this usually occurs in the late stages of polymerization and in the process of this invention the polymer formed is continually removed and doesn't reach this stage. In addition, the polymer product precipitates readily from the reaction mixture in finely divided form suitable for the preparation of solutions in the volatile organic solvents described in U. S. 2,404,714 to U. S. 2,404,727 inclusive. Further, the products produced by the process of this invention can be used directly in wet-spinning or casting techniques without the use of intermediate costly steps, such as blending or the extraction of polymeric aggregates of unsuitable molecular weight.

Any departure from the procedure described herein which conforms to the principles of the invention is intended to be included within the scope of the claims below.

I claim:

1. A process for the polymerization of acrylonitrile to a polymer having a uniform high molecular weight which comprises carrying out the polymerization in the presence of a water-soluble perdisulfate as the sole catalyst in a medium the acidity of which is maintained, by adding acid during polymerization, at a substantially constant pH which has a value between about 4.0 to about 6.3.

2. A process in accordance with claim 1 in which the said pH value is between 5.0 and 5.8.

3. A process in accordance with claim 1 wherein said polymerization is carried out at a temperature of from 40 to 75° C.

4. A process in accordance with claim 1 wherein the said catalyst is present in amounts from 0.5% to 4%.

5. A process in accordance with claim 1 wherein the said catalyst is ammonium perdisulfate.

6. A process for the polymerization of acrylonitrile to a polymer having a uniform molecular weight within the range of about 130,000 to about 220,000 which comprises placing the said acrylonitrile in an aqueous medium containing a perdisulfate as the sole catalyst and having a pH value between 4.0 and 6.3; subjecting said acrylonitrile to polymerization in the said medium; and maintaining the acidity of the said medium substantially constant at a pH which has a value between 4.0 and 6.3 by adding acid during polymerization.

7. A process in accordance with claim 6 in which the said molecular weight is kept between about 160,000 and about 220,000 and the catalyst concentration is about 2.0% by weight of the acrylonitrile.

8. A process in accordance with claim 7 in which the said molecular weight is kept between about 160,000 and about 187,000 and the pH is maintained between 5.0 and 5.8.

9. A process in accordance with claim 6 in which the polymer is continually removed as it is formed during polymerization.

10. A process for the polymerization of acrylonitrile to a polymer having a uniform molecular weight within the range of 155,000 to 175,000 which comprises placing the said acrylonitrile in a medium containing 2.0% based on the said acrylonitrile of ammonium perdisulfate as the sole catalyst; adjusting the pH to 5.4; maintaining the acrylonitrile constant of the medium to about 2.7% by weight; maintaining the temperature at about 60° C.; maintaining the pH at about 5.4 by adding acid during the polymerization; and continually removing the polymer from the medium as it is formed during polymerization.

HUGH T. PATTERSON.

References Cited in the file of this patent

UNITED STATES PATENTS

| Number | Name | Date |
|---|---|---|
| 2,462,354 | Brubaker et al. | Feb. 22, 1949 |
| 2,486,241 | Arnold | Oct. 25, 1949 |
| 2,546,238 | Richards | Mar. 27, 1951 |